UNITED STATES PATENT OFFICE.

CARL MARIA PIELSTICKER, OF LONDON, ENGLAND.

IMPROVEMENT IN PROCESSES FOR REFINING CRUDE OZOKERITE.

Specification forming part of Letters Patent No. 186,951, dated February 6, 1877; application filed March 22, 1876.

*To all whom it may concern:*

Be it known that I, CARL MARIA PIELSTICKER, of No. 5 Sydney Terrace, Kilburn, in the county of Middlesex and Kingdom of England, have invented an Improved Process for Refining Crude Ozokerite, of which the following is a specification:

This invention relates an improved process of refining crude ozokerite without distillation and without pressure, whereby I obtain a larger yield of refined product with great economy of production, and a refined wax of a higher melting-point than paraffine or stearine obtained by the ordinary process of distillation.

I melt the crude ozokerite, keeping it while melted at a temperature somewhat above the boiling-point of water, in any suitable agitator, in which I add to it about twelve per cent. of strong sulphuric acid. I find it advantageous to add this acid in four equal quantities, and keep it agitated with the ozokerite. I keep up the agitation until a drawn sample, freed from impurities and from the formed carbonaceous particles, presents a yellow color. I then wash the mixture with hot water, allow it to settle, and draw off the settled water and impurities which have been deposited at the bottom of the agitator. I now add to and agitate with the partially-treated ozokerite about five per cent. of carbonate of baryta, to which I add, further, a strong solution of caustic soda in water, say about five per cent., in order to fully neutralize the acid, and to assist the carbonaceous particles formed by the action of the acid on the ozokerite in settling from the liquid ozokerite at the bottom of the agitator, from which they are drawn off and removed. During this latter agitation I allow steam to pass freely through the melted ozokerite.

If the carbonaceous particles and impurities have not been sufficiently precipitated, it will be advantageous to add to the melted ozokerite in the agitator a quantity of any saponifiable oil or fat, or soap, rosin, or crude turpentine, which should be well agitated with the melted ozokerite; caustic soda in solution should then be added thereto in quantity sufficient to saponify the oil, fat, rosin, or crude turpentine, and the mass be kept well agitated.

The soap formed by the combination of the oil, fat, rosin, or crude turpentine with the soda will, after the agitation has ceased, settle at the bottom of the agitator, carrying with it most of the impurities, which are then drawn off, and the ozokerite remaining in the agitator is again agitated with hot water and steam until all soapy matter and most of the impurities are removed, and until the last particles of odor are eliminated.

In order to remove the last particles of impurities the melted ozokerite is then drawn off and passed through a filter closely packed with finely granulated or powdered and dried clay, or clay and charcoal combined, which will retain all solid impurities.

The ozokerite so far purified presents a yellowish color; and in order to remove this color still further, and to obtain a whitish wax-like substance, I melt the ozokerite in a second clean agitator, and agitate it with a sufficient quantity of finely granulated or powdered animal charcoal, using increased quantities of charcoal when necessary, until the ozokerite has obtained the desired degree of whiteness.

In order to remove the particles of charcoal that may be mechanically suspended in the saponified ozokerite, I draw off the contents of the second agitator and pass them through any suitable filtering material, which will retain these particles of charcoal, and I thus obtain a whitish wax-like material, which is suitable for candle-making, and for most purposes for which bees-wax, stearine, and other similar substances are now used.

I claim as my invention—

The process of refining crude ozokerite by melting in an agitator, then adding sulphuric acid, agitating, and, when a drawn sample, freed from impurities, presents a yellow color, drawing off the impurities and washing the ozokerite repeatedly with hot water, allowing it again to settle, and then agitating with carbonate of baryta and caustic soda; when sufficiently agitated drawing off the spent chemicals, and adding to the ozokerite a saponifiable oil, or fat, rosin, turpentine, or soap, and caustic soda, agitating, allowing to settle, drawing off impurities, washing repeatedly in hot water, allowing to rest, and, when the ozokerite is of a light-yellow color, filtering it through animal charcoal, so as to obtain a whitish wax-like material, suitable for similar purposes for which bees-wax, paraffine, and stearine are now in use, substantially as described.

C. M. PIELSTICKER.

Witnesses:
WILLIAM EDWARD GEDGE,
JOSEPH WHITTLESAY.